(No Model.) 5 Sheets—Sheet 2.

R. L. HUNTER & H. B. HIGGINS.
ELECTRICAL ANNUNCIATOR.

No. 574,327. Patented Dec. 29, 1896.

Witnesses
F. T. Bradbury
H. S. Johnson

Inventors: Robert L. Hunter.
Henry B. Higgins.
per: T. D. Merwin
Attorney.

THE NORRIS PETERS CO., PHOTO-LITHO., WASHINGTON, D. C.

(No Model.) 5 Sheets—Sheet 3.

R. L. HUNTER & H. B. HIGGINS.
ELECTRICAL ANNUNCIATOR.

No. 574,327. Patented Dec. 29, 1896.

Witnesses:
F. G. Bradbury.
H. S. Johnson.

Inventors: Robert L. Hunter.
Henry B. Higgins.
per: Attorney.

(No Model.)    5 Sheets—Sheet 5.

R. L. HUNTER & H. B. HIGGINS.
ELECTRICAL ANNUNCIATOR.

No. 574,327. Patented Dec. 29, 1896.

Witnesses:
F. S. Bradbury.
H. S. Johnson.

Inventors: Robert L. Hunter.
Henry B. Higgins.

per: T. D. Merwin
Attorney.

THE NORRIS PETERS CO., PHOTO-LITHO., WASHINGTON, D. C.

UNITED STATES PATENT OFFICE.

ROBERT L. HUNTER AND HENRY B. HIGGINS, OF MINNEAPOLIS, MINNESOTA, ASSIGNORS TO THE AMERICAN SIGNAL AND POWER COMPANY, OF MINNESOTA.

ELECTRICAL ANNUNCIATOR.

SPECIFICATION forming part of Letters Patent No. 574,327, dated December 29, 1896.

Application filed November 19, 1895. Serial No. 569,453. (No model.)

*To all whom it may concern:*

Be it known that we, ROBERT L. HUNTER and HENRY B. HIGGINS, of Minneapolis, Hennepin county, Minnesota, have invented certain Improvements in Electrical Annunciators, of which the following is a specification.

Our invention relates to improvements in electrical annunciators, its object being to provide an improved form of apparatus adapted to be used with either an open or closed circuit battery, and by means of which calls and signals are given and all the work of the apparatus performed without breaking or interrupting the circuit until such work is completed.

To this end our invention consists in the various features of construction hereinafter particularly described and claimed.

Figure 1:
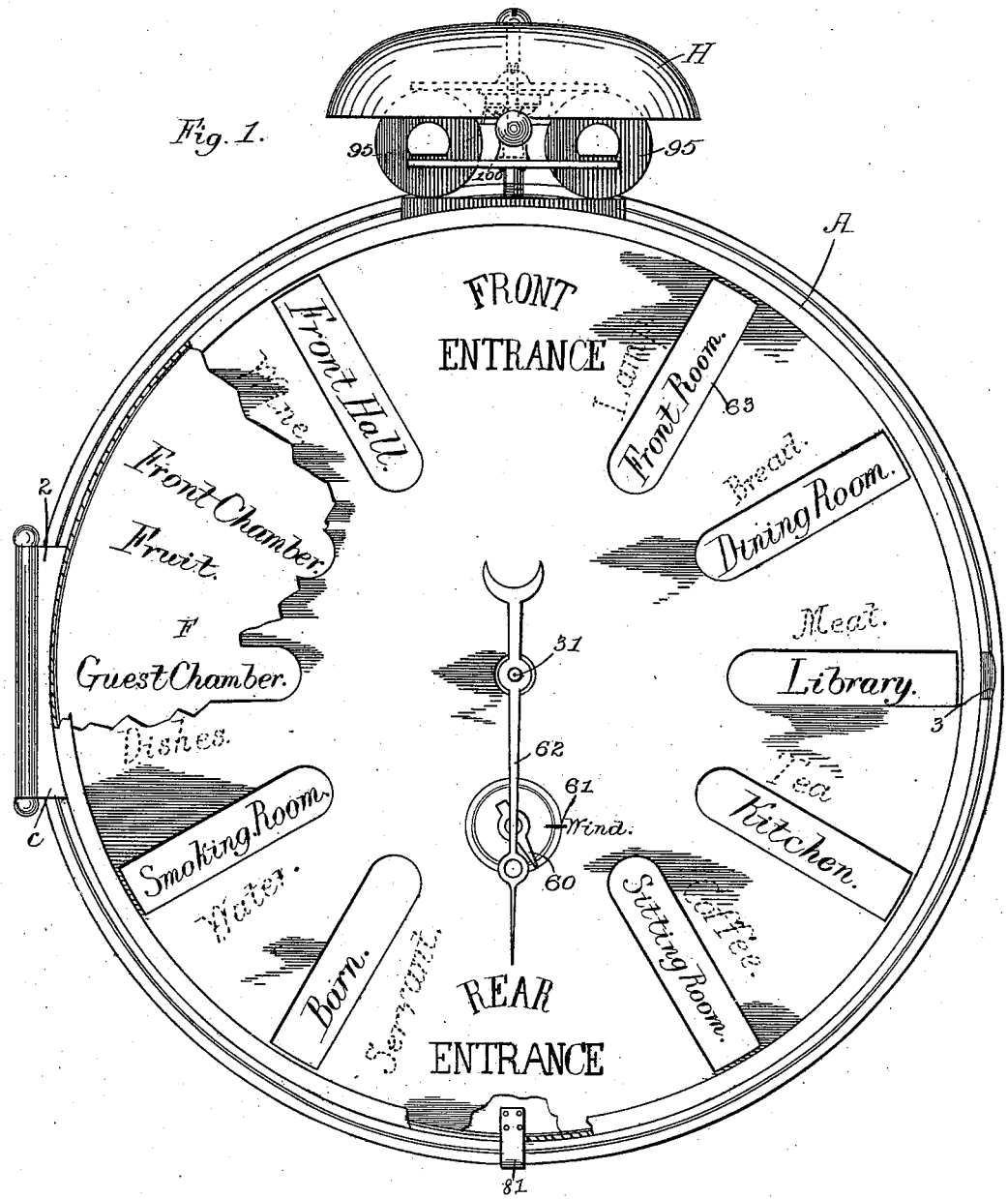
Figure 2:
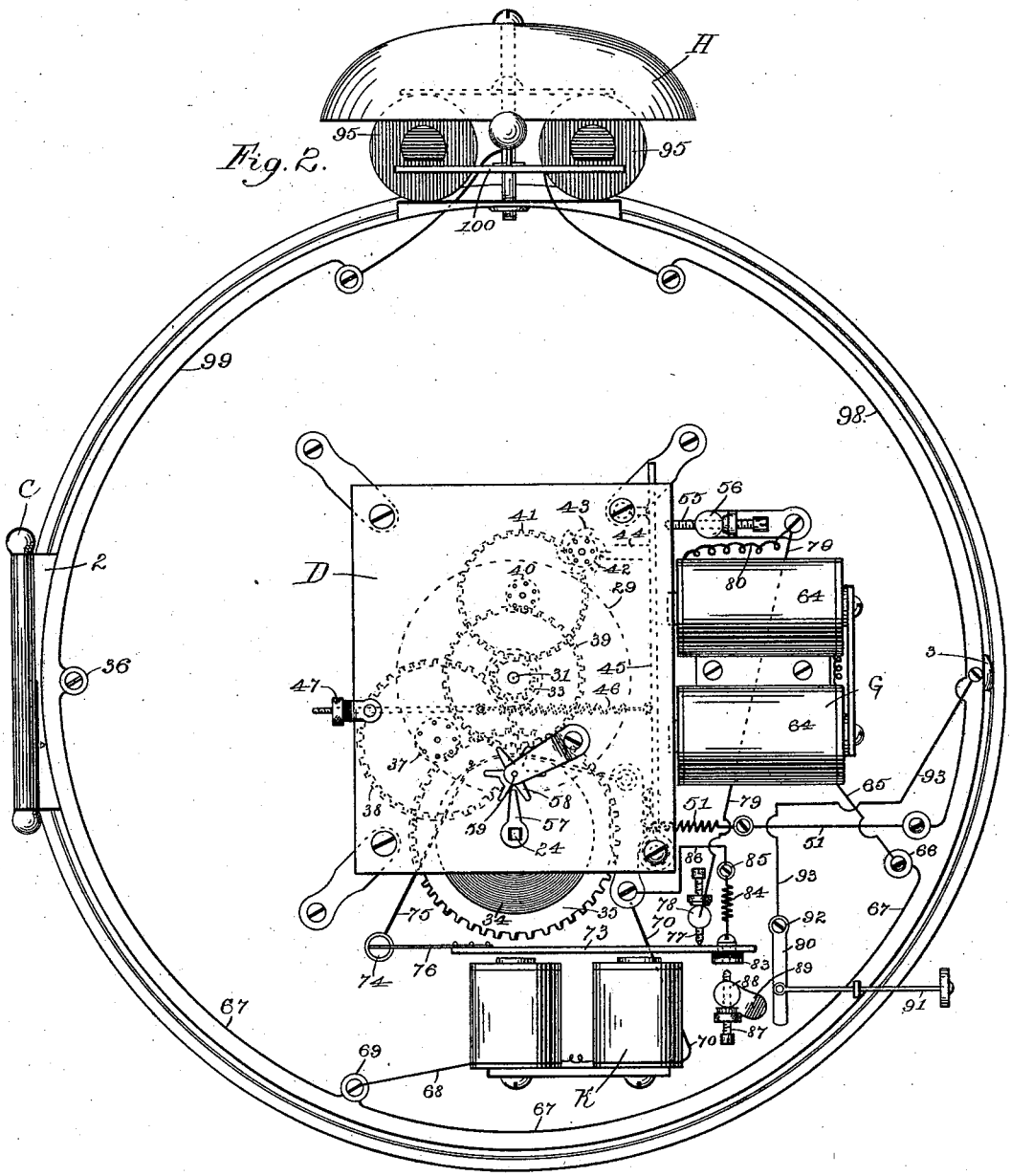
Figure 3:
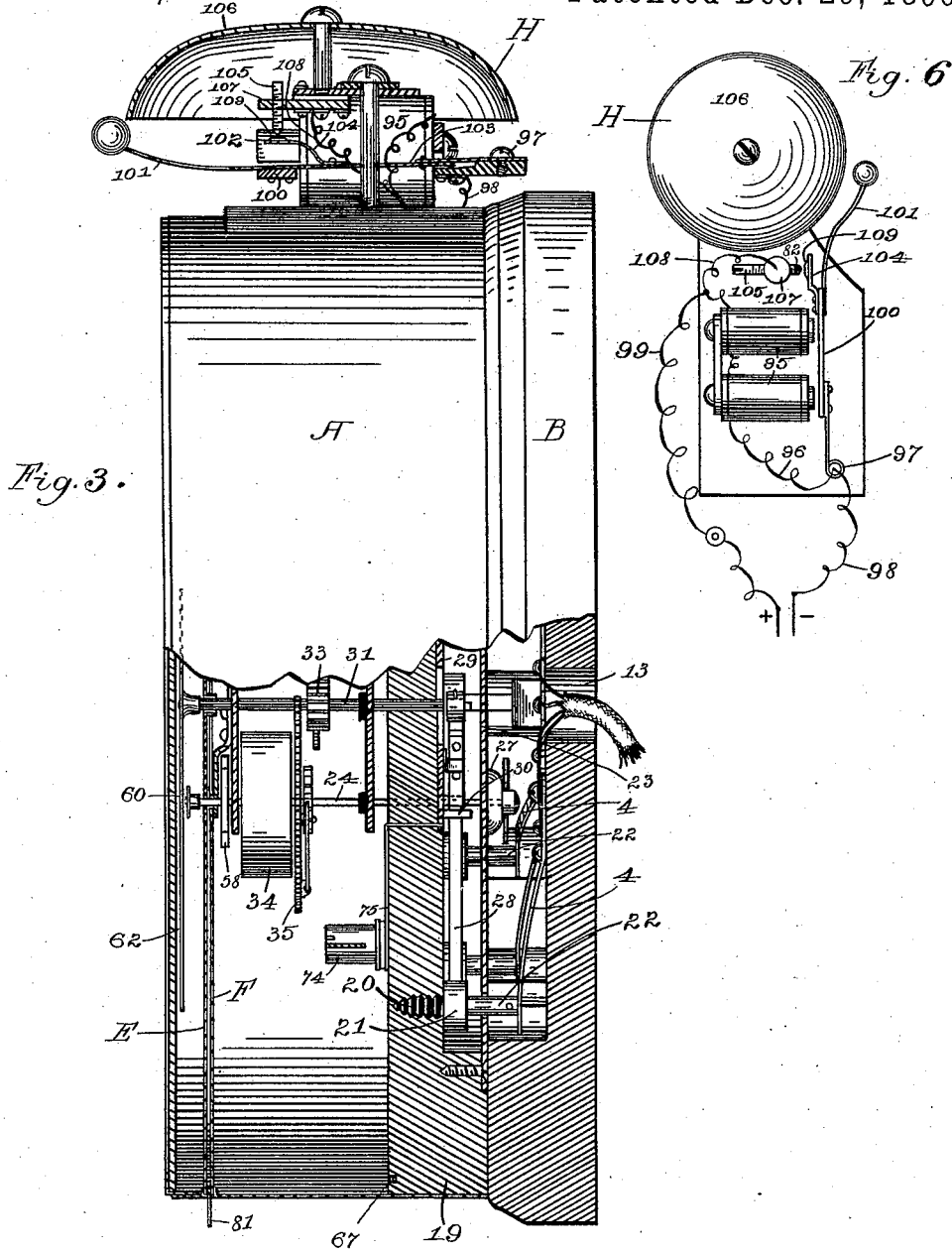
Figure 4:
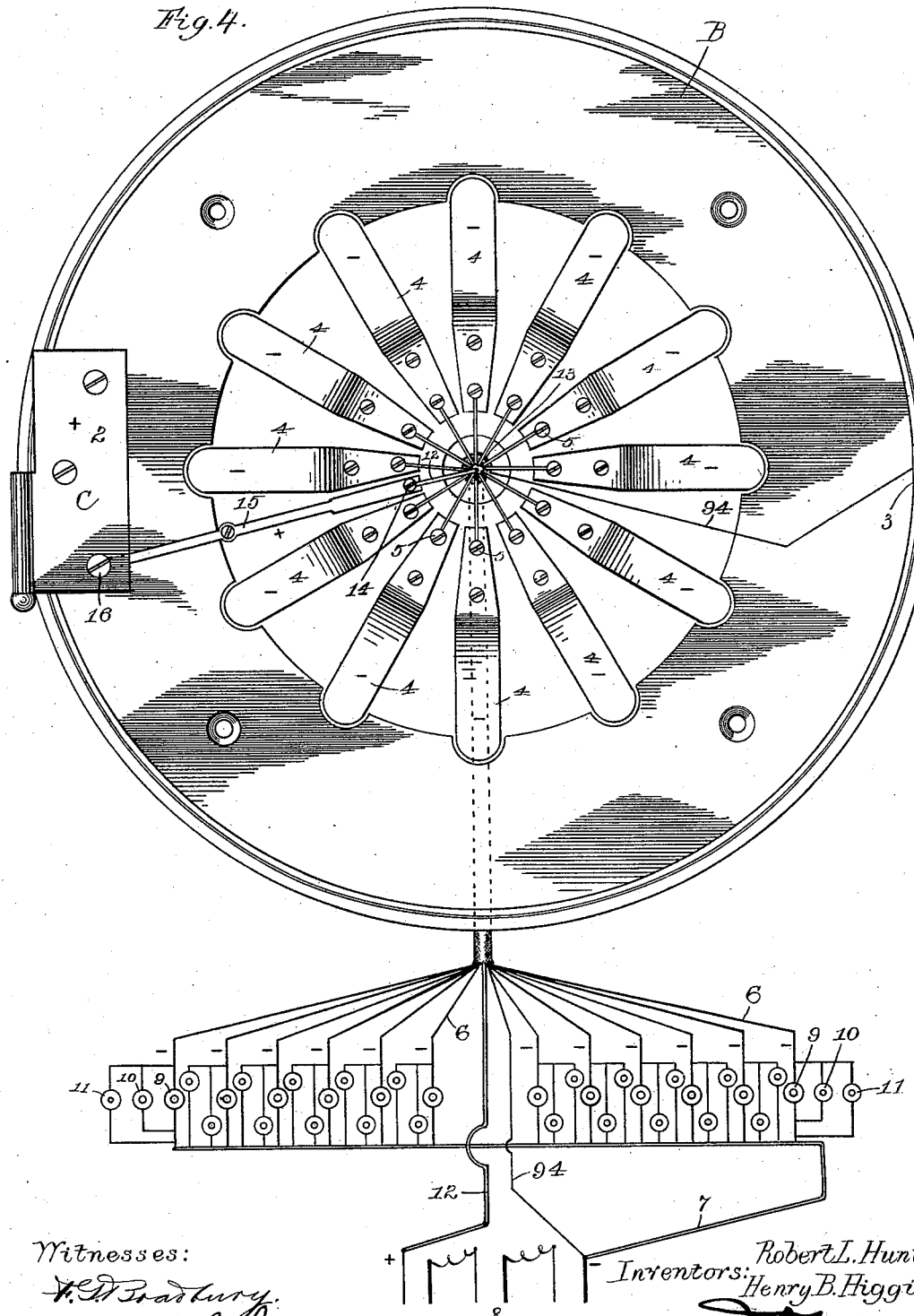
Figure 5:
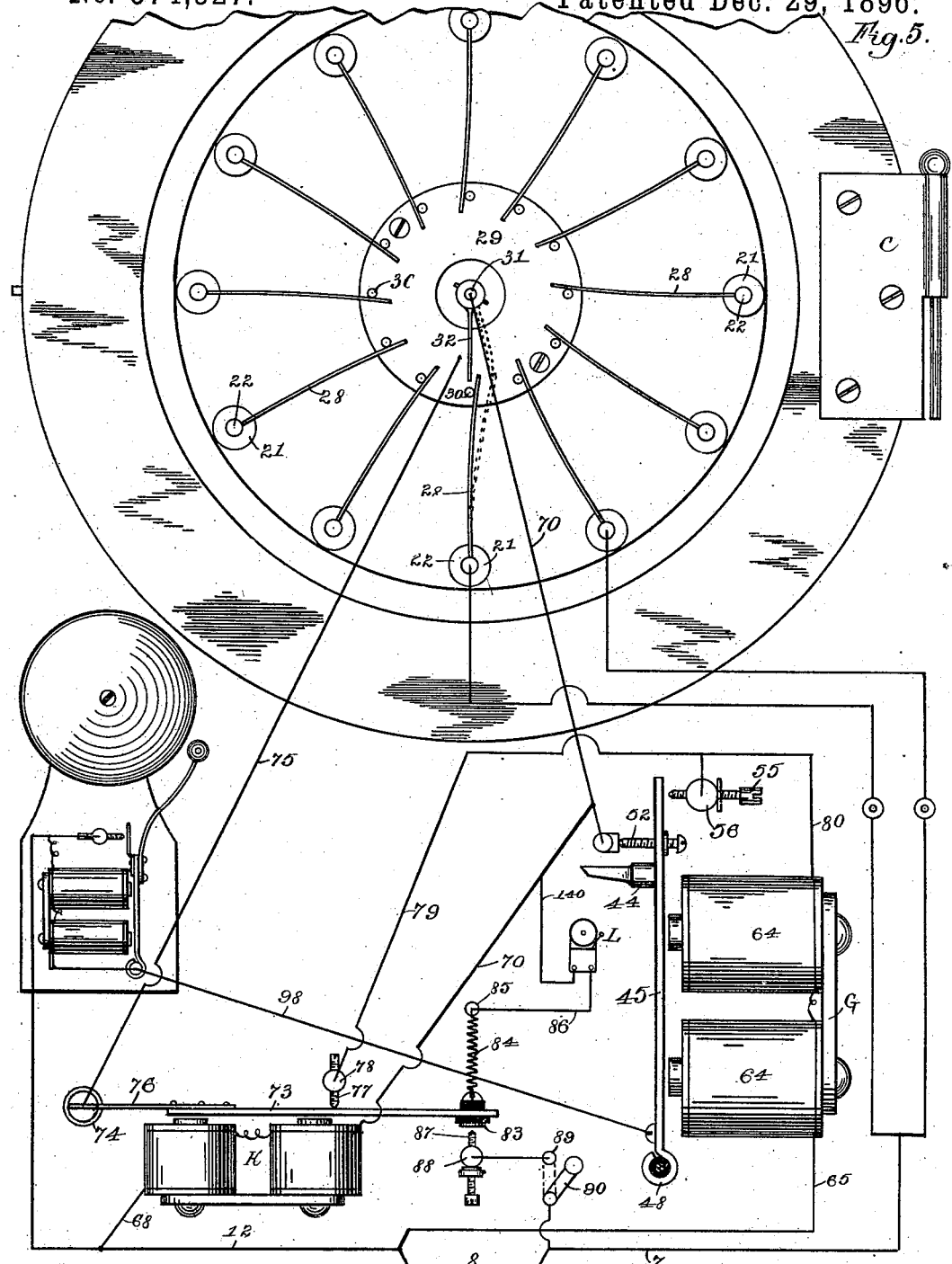

In the accompanying drawings, forming part of this specification, Figure 1 is a front elevation of our improved instrument, the outside slotted dial being partly broken away to disclose the shifting inscribed dial in the rear, the figure also showing the winding-indicator and the means for shifting the rear dial. Fig. 2 is a similar view of the apparatus with the dials removed so as to disclose the operating mechanism. Fig. 3 is a side elevation and partial section of the apparatus, showing the leading-in wires and contacts between the fixed base and removable part and the construction of the signal-bell and contact-posts. Fig. 4 is an elevation of the base to which the instrument is connected, showing the series of spring-contacts and conventionally the several connected circuits. Fig. 5 is a detail of the circuit-locating mechanism with the burglar or other alarm attachments, batteries, bells, the main and relay magnets, and the connected circuits shown conventionally; and Fig. 6 is a conventional detail of the signal-bell, illustrating the circuit connections and the variable-resistance contacts.

In the drawings the annunciator is shown of two parts, the case A, inclosing the running parts of the apparatus, and the base B, which is adapted to be secured permanently to a wall or other suitable support, and to which the case A with its parts is detachably connected by means of the hinge 2 and catch 3. (See Fig. 4.) Arranged as permanent parts and attachments of the base (see Fig. 4) are the radially-arranged spring-contacts 4, each connected by means of the binding-screw 5 with a branch leading-in wire 6, all of which are connected to the main wire 7, leading, as shown, to the negative pole of the battery 8. Each of these contacts represents the same indication or call in each of the series of the annunciator, and arranged in multiple in each of the branch wires, as shown in Fig. 4, are three push-buttons or circuit-closers 9, 10, and 11, pertaining to the interchangeable series of calls or indications, more particularly hereinafter described. The base B has a central opening 13, through which all of the wires leading from the battery and push-buttons are passed. The positive wire 12 connects by means of the binding-screw 14 with the conductor 15, which leads to the screw 16, whereby it is electrically connected with the member 2 of the hinge C, this hinge being in turn electrically connected through its detachable member 17, which is secured to the back of the case A, and the wire 18 to the binding-screw 36. (See Fig. 2.)

The rear of the case A is provided with a wooden disk or back 19, centrally recessed, as shown best in Fig. 3, within which recess are symmetrically secured the wood-screws 20, each having the head 21 and axial stud 22, which studs project far enough from the case to make contact with the springs 4 when the annunciator is secured to the base in normal position. The circular recess in the back is covered preferably by means of the insulating-disk 23, having openings through which pass the studs 22.

Rigidly connected to the studs 22 are the spring-arms 28, which project toward the center in substantially radial arrangement. Concentrically arranged upon the back is the annular plate or ring 29, near the periphery of which is arranged a series of studs 30, one for each of the spring-arms 28, and against which it normally bears. At the center is arranged the arbor 31, connected with the running parts of the apparatus and carrying the contact-arm 32, adapted in its rotation to sweep the inwardly-projecting tips of the spring-arms 28, so as to switch the current flowing through any spring-arm 28 from the stud 30 to the contact-arm 32 and its electrically-connected parts. The opposite end of the arbor 31 carries the pinion 33, arranged within the train of gears D, which is actuated by the main spring 34, operatively connected to the gear 35. (See Fig. 2.) This gear drives successively the pinion 37, its gear 38, the pinion 33, its gear 39, the pinion 40, its gear 41, and the pinion 42. (See Fig. 2.) The arbor driven by the pinion 42 is provided with ratchet-teeth 43, engaged by the detent or dog 44, carried by the armature 45, which is controlled by the spring 46, having its tension adjustable by means of the insulated thumb-screw 47. (See Fig. 2.) The armature 45 (see Fig. 5) is formed with an eye 48 at its pivoted end, which is insulated from the pivot-stud. To it is also connected the wire 51, (see Fig. 2,) having the hereinafter-described connections, and its free or oscillating end 54 carries the contact-finger 52, which normally bears against the stud 53 of the works, the armature in its opposite movement, as hereinafter described, making contact with the screw 55 in the post 56, having the electrical connections hereinafter described. (See Figs. 2 and 5.)

The arbor 24 of the gear 35 (see Fig. 2) is provided with the arm or tooth 57, (see Fig. 2,) which engages the toothed wheel 58 upon the arbor 59, so that each rotation of the gear 35 in the process of winding turns the wheel 58 one step. The arbor 59 carries an indicator or point 60 upon the face of the annunciator, (see Fig. 1,) by means of which the condition of the driving-spring is shown, the parts being so adjusted that when the pointer reaches a certain position, as, for example, that illustrated at 61, the indication is that the works are nearly run down and require rewinding. Upon the arbor 31 is mounted the indicator-needle 62. (See Fig. 1.)

The front of the case A is provided with a fixed outer face or dial E, provided with a series of radial slots 63 and also carrying inscriptions, such as those shown in Fig. 1, which are intended to always be subject to call or indication. This dial is covered and protected, preferably, by a glass plate, as ordinarily used in such apparatus. In the rear of the dial is arranged the shifting disk or dial F, upon which are arranged radially a plurality of series of inscriptions or notations, so placed that with the shifting of the dial by means of the handle 81 or other suitable means the several notations of any series may be brought into registering position with the slots 63. The several indications or notations of each series correspond respectively with the spring-contacts of the base and their corresponding studs which bear thereon. (See Figs. 3 and 4.) Arranged within the case is the electromagnet G, (see Fig. 2,) with the coil-windings 64 of which the positive pole of the battery 8 is connected by wire 12, conductor 15, screw 16, hinge 2, (see Fig. 4,) screw 36, wire 67, binding-post 66, and wire 65. (See Fig. 2.) The wire 51, connected to the armature 45, leads to the coils of the magnet of the bell H.

K is a secondary or relay electromagnet also arranged within the case, having its coils connected by the wire 68 to the wire 67 through the interposed binding-post 69 and by the wire 70 to the metallic works, which in turn conducts the current to the arbor 31. Its armature 73, having spring-support 76 upon the post 74, is electrically connected through said post and by the wire 75 with the metallic ring 29. (See Fig. 2.) The armature is held normally out of contact with the magnet by its spring. When thus out of contact, it bears upon the screw 77, which is electrically connected, through its post 78 and wire 79, with the post 56, with which post also the coils 64 of the magnet G are connected by the wire 80. The armature 73 carries an insulated contact-plate 83, which is connected by the wire 84 with the post 85 and thence by the wire 86 directly to the works, or, as shown in Fig. 5, through the intermediate alarm-signal L and wire 140. When the armature of the magnet K is drawn to it, the contact-plate 83 strikes the screw 87 in the post 88, which is provided with a contact-spring 89, with which the switch 90, adapted to be operated by the push-button 91, makes contact. This switch is pivoted upon the screw 92, connected by the wire 93 with the catch 3 upon the base, which catch is connected by the wire 94 (see Fig. 4) with the negative pole of the battery 8. These last-described features constitute the burglar or other alarm attachment, the operation of which is hereinafter described. The construction and electrical connections of the bell H are shown best in Fig 3 and conventionally in Fig. 6. The coils 95 of its magnet are connected by the wire 96 to the post 97 and thence by the wire 98 to the wire 51, leading to the negative pole of the battery, and are also connected by the wire 99 with the binding-post 36 (see Fig. 2) and thence to the positive pole of the battery. The armature 100, mounted upon the post 97 and provided with the hammer 101, is thus in electrical connection with the wire 98.

To secure compactness in construction, we prefer to arrange the magnet-coils 95 horizontally and to flatten the under surface of the projecting ends of the poles 102 and arrange the armature 100 to bear upon said flattened surfaces. We also support the armature upon a spring 103, which, together with the weight of the hammer, normally holds the armature out of contact with the magnet-poles. Connected to the armature or the hammer-arm is the spring 104, which makes contact with the screw 105 when the hammer strikes the gong 106. This screw is set in the post 107, which is in a short circuit around the magnet-coils by means of the wire 108, connecting it to the wire 99. Consequently in the ringing of the bell the circuit is not broken, but simply short-circuited through the armature and screw, so that the current flows continuously either in the main or branch circuit, and the bell is thus caused to ring continuously as long as the current is flowing through the wire 98.

In order to introduce a variable resistance into the branch circuit just described, so as to prevent the current flowing away from the coils of the magnet before the hammer strikes the gong, we secure upon the spring 104 a carbon disk 109 and upon the contact-screw 105 a tip of carbon 82. By this means the current is not carried through the branch circuit until the spring bears against the screw with sufficient pressure to reduce the resistance in the branch circuit below that of the coils of the magnet and thus shunt the current therethrough. In other words, the magnet remains energized sufficiently to cause the hammer to strike the gong before the current is carried by an arc from the spring 104 to the screw 105, and the carbon also serves to prevent corrosion of the points of contact.

As appears more clearly in the description of the operation of the apparatus, it is important, if not essential, that a time-closing push-button for making a call or giving a signal should be employed to keep the circuit closed, after being actuated, for an appreciable or predetermined period.

In installing our improved apparatus the base is attached to the wall or other suitable support where it is desired to have the signals given or the calls made, or any number of bases may be attached at different points with corresponding systems of wiring, and the annunciator may then be attached to the base, or such one of the bases as is desired, in readiness for use. The annunciator can also be opened or turned on its hinge, so as to furnish convenient access to the rear of the machine for the purpose of winding or repair or to disengage the contacting parts.

As shown in the drawings, there are two series or sets of notations or indications upon the shifting dial, and the conventional wiring shown in Fig. 4 illustrates the adaptation of the apparatus for three sets of signals or calls, although it is evident that any number of series or sets may be employed to meet practical requirements by simply multiplying the necessary parts.

For convenience the three services herein shown may be denoted, respectively, "service-calls," "want-calls," and "burglar-alarm." The push-buttons or circuit-closers 9 may be assigned to the service-calls, the circuit-closers 10 to the want-calls, and the circuit-closers 11 to the burglar-alarm service. The service-call push-buttons are of course distributed among the different rooms, as of a hotel, to serve the ordinary purpose of a simple call. Take any one station or room, and it may be equipped with its appropriate service-call push-button and with a series of push-buttons corresponding to the several want-calls, and its windows, for example, each equipped with a circuit-closer to be operated by the opening of a window, these burglar-alarm circuit-closers being arranged in multiple in the appropriate subbranch circuit, as illustrated in Fig. 4.

Referring now to Figs. 2, 4, and 5, the circuits may be traced as follows: Take any one of the branch wires 6 (indicated conventionally in Fig. 4,) the circuit is from battery through wire 7, selected wire 6, its spring 4, opposed stud 22, (see Fig. 5,) spring 28, stud 30, ring 29, wire 75, (see Figs. 2 and 5,) binding-post 74, spring 76, armature 73 of the relay-magnet K, screw 77, post 78, wire 79, post 56, wire 80, magnet-coils 64, wire 65, screw 66, wire 67, binding-screw 36, hinge 2, conductor 15, wire 12, to the battery. The push-button 9 being depressed the above-described circuit is closed, thereby energizing the magnet G, drawing the armature 45 to it, and withdrawing the detent 44 (see Fig. 2) from the ratchet 43 and allowing the train of gear to operate under the impulse of its spring 34. Simultaneously the divided circuit is established through the signal-bell H, the current dividing at the screw 55, the divided circuit being therefrom through the armature 45, wires 51 and 98 to the bell, thence through the wire 99 to the screw 36. The arbor 31 rotates until its arm 32 comes in contact with the spring-arm 28, corresponding to the push-button depressed. At the first contact the current is divided, part passing through the following-described divided circuit: arm 32, arbor 31, conducting-works, wire 70, coils of the magnet K, wire 68 to the wire 12 of the above-described circuit.

The energizing of the magnet K draws its armature away from the screw 77, thus opening the circuit of the magnet G and preventing its being closed again by the action of any push-button until the divided circuit through the relay-magnet has been broken at the push-button originally depressed. This makes it impossible for the first call to be interfered with by the simultaneous depressing of another push-button whose electrical connection is subsequent or second in position to that of the first push-button, or by any subsequently depressed, until the apparatus shall have completed its work. On the opening of the circuit of the magnet G another bell-circuit is immediately established from the train of gear through the armature 45, wire 51, wire 98, bell H, and thence to the opposite pole of the battery. (See Fig. 5.) The bell thus sounds from the instant the push-button is depressed till the circuit is broken at the push-button, a short circuit being alternately established and broken around the magnet-coils 95, as hereinbefore described, the time-closing of the button being adjusted to meet any possible requirements.

It will thus be seen that so long as the push-button remains depressed circuits remain closed through the alarm-bell, thus continuing the alarm, and through the relay-magnet, so as to keep the main-magnet circuit open and preventing the depressing of any other push-button from interfering with the call until the machine has done its work.

The operation may be more fully described as follows: The caller having depressed the "service-button" so as to cause the apparatus to operate and the bell to ring and the point from which the call is made to be indicated, the attendant switches the shifting dial to disclose the want-calls. The caller then depresses the button 10 corresponding to the want, and the same operation of the machine is repeated until the want is indicated by the pointer and the apparatus stops, the bell continuing to ring each time till the push-button breaks the circuit. After this caller's want has been made known another caller can repeat the operation for his use, but no such subsequent caller can interfere with the first call. When it is desired to set the apparatus to guard the house from the attack of burglars at night, the dial being set to show the various call stations or rooms, the push-button 91 is operated to throw the switch-arm 90 into engagement with the contact-piece 89. If, then, an attack is made at any point guarded by circuit-closer 11, the circuit is closed and the apparatus operates to give the indication of the point of attack or room. Another circuit is also closed through the wire 94, (see Fig. 4,) the catch 3, wire 93, (see Fig. 2,) post 92, switch-arm 90, contact 89, post 88, screw 87, contact 83, wire 84, screw 85, wire 86, alarm-signal L, (see Fig. 5,) and wire 140 to the wire 70, coils of magnet K, wire 68, wire 67, screw 36, conductor 15, wire 12 to the battery. (See Figs. 2, 4, and 5.) It will thus be seen that the circuit thus established will remain closed by reason of the energizing of the magnet K, which holds the armature 73 drawn down with the piece 83 in contact with the screw 87, so as to cause the call-bell H and also the alarm-signal L to continue ringing until the battery becomes weakened to such degree that the armature is released from the magnet K, so as to break the circuit, the object of this being to provide an automatic breaking of the circuit before the battery becomes ruined. With this limitation the current continues to flow and the bell to ring until the switch 90 is opened by an attendant. In other words, the slightest tampering with the window or other part guarded as above described will cause the circuit to close and remain closed until the battery is exhausted, although the tampering may be merely momentary and the window or other part be immediately closed again by the alarmed intruder.

While we have shown and described the apparatus connected to an open-circuit battery, it is obvious that it may be used in connection with a closed-circuit battery or a power-current.

When the apparatus is installed in a hotel, means for giving a return-signal from the office to the room to indicate that the guest-call has been heard and attended to should usually be provided, but as this feature is old and forms no part of the present invention it is neither shown nor described. When the apparatus is installed in a dwelling-house, the want-calls are assigned to only one room, as, for example, the dining-room, the remaining rooms of the house having merely the service-calls and the burglar-alarm-circuit closers. In this case the dial of the annunciator will stand normally during the day disclosing the room-numbers. At meal-hours it is shifted so as to disclose the want-calls, and at night is set to disclose the notations of the points guarded by the burglar-alarm-circuit closers.

The three services or series of notations and corresponding series of circuit-closers herein shown and described are merely illustrative, since their number may be multiplied indefinitely without increasing the number of main, circuit, or line wires. Thus with a given number of main and circuit wires a corresponding number of rooms may be connected with the central office, while by the use of the branch wires provided with a like number of circuit-closers in multiple the same wires may be brought into use to signal the tampering with any of the several windows and doors of any room, and also a like number of want-calls of a dinner-service may be accommodated by placing their push-buttons also in branch lines in multiple and locating them in the room from which the want-calls are to be made.

We claim—

1. In a bell of the class described, the combination with the magnet having its coils in the battery-circuit, the gong, the armature connected to said circuit, the hammer carried by said armature, the contact-screw connected to said battery-circuit on the other side of the magnet-coils from the armature connection, and the carbon contacts interposed between the armature and screw.

2. In an apparatus of the class described, the combination with the train of gear, its indicating mechanism, the releasing-magnet, its battery, the signal-bell in circuit with said train of gear and the circuit-closers, of the relay-magnet in circuit with said train and its armature, and the make-and-break device operated by said armature, both included in the main-magnet circuit, whereby the closing of the circuit through the train of gear energizes said relay-magnet so as to cut the main magnet out of circuit, and prevent interference with the operation of the apparatus by the actuating of another circuit-closer, either subsequent in time of operation or electrical connection to the circuit-closer first operated.

3. In an apparatus of the class described, the combination with the train of gear, the indicating mechanism, the signal-bell, the main magnet for tripping said train of gear, and the series of push-buttons for closing the circuit through said magnet to release said train, of the relay-magnet in a divided circuit with said train of gear and battery, and having its armature and a make-and-break device operative by said armature in circuit with said main magnet.

4. In an apparatus of the class described, the combination with the battery, the spring-actuated train of gear, its indicating mechanism and the train-releasing magnet, of the signal-bell in circuit alternately with said magnet and with said train, whereby simultaneously with the making of the circuit through said magnet, and so long as the train operates, said bell is sounded, and when said train stops the bell is switched into circuit therewith, so as to continue ringing until the circuit is broken.

5. In an apparatus of the class described, the combination with the battery, the spring-actuated train of gear, its indicating mechanism, the train-releasing magnet, the relay-magnet in circuit with the train, its armature and a make-and-break device operative by the armature both in circuit with the main magnet, and the signal-bell in circuit alternately with the main magnet, and with the train of gear, whereby the signal-bell is operated from the time the circuit is closed through the main magnet until the circuit is broken at the push-button, and the main magnet is cut out of circuit from the time the train is stopped and the indication made until the circuit is broken at the push-button.

6. In an apparatus of the class described, the combination with the battery, the spring-actuated train of gear, the main magnet for releasing the train, the relay-magnet in a divided circuit with said train alternative with the circuit of the main magnet, the relay-magnet armature and a make-and-break device operative by it both in the main-magnet circuit, and the signal-bell alternately in the circuit of the main magnet while energized, and in the circuit of the train when the main magnet is deënergized, whereby the current from said battery is uninterrupted from the time the circuit-closer is actuated until it is released.

7. In an apparatus of the class described, the combination of the open-circuit battery, the train of gear normally out of circuit, but adapted to be switched into circuit therewith in the operation of the machine, its indicating mechanism, the main magnet for releasing the train in the main circuit, the relay-magnet in a divided or secondary circuit with the train, its armature, and a make-and-break device operative by it both in the main circuit, the signal-bell, its magnet in a divided circuit with the main magnet when energized, and in a divided circuit with the train of gear when the magnet is deënergized, its hammer-carrying armature, and the make-and-break device operative by it, both in a branch circuit around the bell-magnet, and the armature of the main magnet arranged in the divided circuit of the signal-bell and train of gear, and serving in its operation to switch said bell-magnet from the main circuit to the divided train-circuit, whereby the bell is sounded continuously from the time the circuit-closer is operated until it is released, and the current through the apparatus and the bell is uninterrupted.

8. In an apparatus of the class described, the combination with the train of gear, and its releasing-magnet, of the secondary magnet in an auxiliary circuit with said train automatically closed by the operation of said train, and its armature and a make-and-break device operative by it both in circuit with the main magnet.

9. In an apparatus of the class described, the combination with the indicating mechanism, its actuating-train, the train-releasing magnet, the signal-bell, the secondary magnet for cutting out the releasing-magnet, and the series of circuit-closers, of the battery and its circuits so connected that the current from said battery is uninterrupted during the performance of all the functions of the described parts, and said functions cannot be suspended or interfered with before completion by the actuating of a circuit-closer subsequent in time or in electrical connection with relation to the one first operated.

10. In an apparatus of the class described, the combination with the train of gear, its releasing-magnet and the circuit-closer in circuit therewith, of the secondary magnet in an auxiliary circuit with said train automatically closed by the operation thereof, and the derived circuit through said secondary magnet automatically closed by its attracted armature.

11. In an apparatus of the class described, the combination with the indicating mechanism, its actuating means, the releasing-magnet, the electric signal-bell, and the series of circuit-closers, of the battery and its plurality of circuits in the apparatus, and automatic means for closing one of the circuits before the breaking of another by the operation of the apparatus, so as to maintain an uninterrupted current through the apparatus so long as the circuit-closer is actuated.

12. In an apparatus of the class described, the combination with the train of gear, its releasing-magnet, the circuit-closer, the signal-bell, the secondary magnet in an auxiliary circuit with said train automatically closed by the completion of its operation, its spring-restrained armature, and the switch for connecting said secondary magnet and signal-bell through a derived circuit with the battery, automatically closed by the energizing of said secondary magnet, whereby the same remains closed so long as the battery-current is sufficient to withstand the tension of said armature-spring.

13. In an apparatus of the class described, the combination with the train of gear, its releasing-magnet, the secondary magnet in an auxiliary circuit closed by the completion of the operation of said train, its spring-restrained armature, the alarm and battery in a derived circuit adapted to be closed by said armature when attracted, and the switch for throwing said secondary magnet into said derived circuit, whereby said circuit is closed by the closing of said auxiliary circuit, and remains closed until the battery is weakened sufficiently to allow the spring of said armature to withdraw it from said magnet, and to open said circuit.

14. In an apparatus of the class described, the combination with the train of gear, the releasing-magnet and the circuit-closer, of a secondary magnet in an auxiliary circuit with said train, automatically closed by the completion of its operation, its spring-restrained armature in the circuit of said releasing-magnet, adapted when drawn to said secondary magnet to open the circuit through said releasing-magnet, an alarm-signal in a derived circuit, adapted to be closed at one point by the attracted armature of said secondary magnet, and the switch for throwing said secondary magnet and its armature into said derived circuit, whereby after the operation of said apparatus the main circuit therethrough is held open, and said derived circuit through said alarm remains closed so long as the battery has sufficient strength to resist the spring of said armature.

In testimony whereof we affix our signatures in presence of two witnesses.

ROBERT L. HUNTER.
HENRY B. HIGGINS.

Witnesses:
T. D. MERWIN,
MINNIE L. THAUWALD.